United States Patent
Freeman

[19]

[11] Patent Number: 5,931,148
[45] Date of Patent: Aug. 3, 1999

[54] ADJUSTABLE GRILL

[75] Inventor: Maynard A. Freeman, Arroyo Grande, Calif.

[73] Assignee: Universal Grills, Arroyo Grande, Calif.

[21] Appl. No.: 09/058,796

[22] Filed: Apr. 13, 1998

[51] Int. Cl.$^6$ ............................................. F24B 3/00
[52] U.S. Cl. ........................ 126/29; 126/30; 126/25 AA; 126/25 A
[58] Field of Search ................ 126/25 R, 25 A, 126/29, 30, 505, 506, 25 AA; 99/421 V

[56] References Cited

U.S. PATENT DOCUMENTS

| | | | |
|---|---|---|---|
| 980,501 | 1/1911 | Doll . | |
| 2,814,286 | 11/1957 | Arnold | 126/29 |
| 3,359,887 | 12/1967 | Cleveland | 126/29 |
| 4,726,349 | 2/1988 | Gehrke | 126/25 R |
| 4,732,138 | 3/1988 | Vos | 126/25 A |
| 4,932,390 | 6/1990 | Ceravolo | 126/25 AA |
| 5,099,821 | 3/1992 | Ceravolo | 126/25 R |

FOREIGN PATENT DOCUMENTS

| | | | |
|---|---|---|---|
| 55071 | 6/1957 | France | 126/506 |

*Primary Examiner*—Carl D. Price
*Attorney, Agent, or Firm*—Daniel C. McKown

[57] ABSTRACT

A food shelf attached to the lower end of a vertical threaded rod engages a nut that is attached to the summit of an arch that rises from a horizontal frame. The frame may be removably set onto a receptacle containing a source of heat, or the same frame can be supported above a source of heat on a set of removable legs. In each case, the height of the food shelf above the source of heat may be adjusted by turning the vertical threaded rod.

4 Claims, 2 Drawing Sheets

ADJUSTABLE GRILL

BACKGROUND OF THE INVENTION

1. Field of the Invention

The present invention is in the field of barbecuing equipment and specifically relates to an apparatus for adjusting the height of a food shelf above a source of heat. The apparatus may be removably set onto a vessel that contains a source of heat, or the apparatus can be supported above a source of heat on a set of removable legs.

2. The Prior Art

In U.S. Pat. No. 4,932,390, issued Jun. 12, 1990 to Ceravolo there is shown a barbecue grill in which a fixed central post extends upwardly from the floor of the fire chamber. The lower end of a threaded rod is received in a socket at the top of the post. The food shelf is connected to a nut that engages the threaded rod, so that when the rod is turned, the shelf is raised or lowered. The shelf, along with the nut and threaded rod can be removed from the barbecue machine simply by lifting the threaded rod from the central post. In contrast, the present invention does not require that the fire chamber be provided with a central post, and also, the apparatus of the present invention can be supported on a set of removable legs for use over a campfire built on the ground.

In U.S. Pat. No. 5,099,821, issued Mar. 31, 1992, Ceravolo expands on his above-mentioned patent by adding an upper chamber and various lever systems for elevating the food shelf In U.S. Pat. No. 980,501, issued Jan. 3, 1911, Doll shows a non-rotating vertical threaded rod suspended above the heat source. The food shelf is connected to a nut that engages the vertical rod, and adjustment of the height of the food shelf is accomplished by rotating the shelf, causing it to ride up or down on the fixed threaded rod.

In U.S. Pat. No. 4,732,138, Vos, in FIG. 9 shows arches that rise from a base. The food shelf is suspended by chains from the arches.

The above are the closest patents found in the search of the prior art. None of the above patents shows or describes the present invention.

BRIEF SUMMARY OF THE INVENTION

A number of barbecue machines currently on the market lack any provision for adjusting the height of the food shelf above the source of heat. To obtain best results from such a machine, it is necessary to construct the fire so that it is neither too large nor too small and in addition it may be necessary to wait until the fire has burned down to a desirable heat before starting to cook the food. The present invention avoids these restrictions by permitting the food shelf to be adjustably positioned closer to and further from the heat source.

The apparatus of the present invention accomplishes this desirable result regardless of whether the fire is contained in a receptacle, such as the base of a barbecue machine, or is simply built on the ground like a campfire. In the latter case, the apparatus of the present invention is supported on removable legs. In the former situation, the legs may be removed and the apparatus may be removably set on top of or into the barbecue machine.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

DETAILED DESCRIPTION OF THE INVENTION

Figure 2:
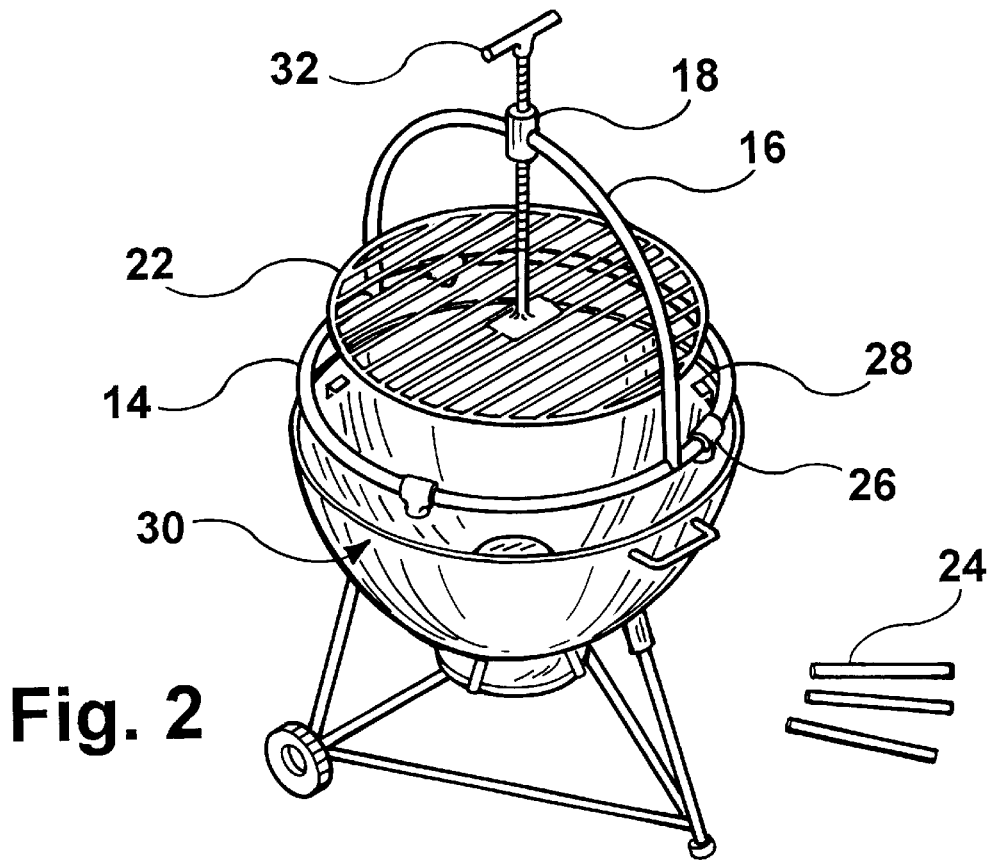
FIG. 2 is a perspective view showing the first preferred embodiment of FIG. 1 used in association with a popular type of barbecue machine.
Figure 1:
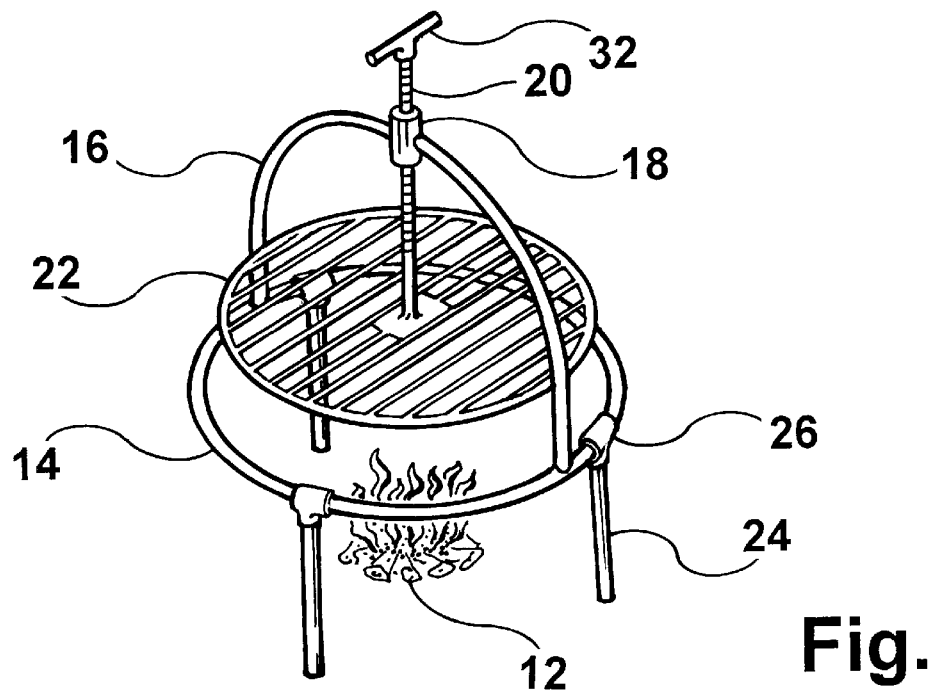
FIG. 1 is a perspective view showing a first preferred embodiment of the present invention in use over a campfire built on the ground.
Figure 4:
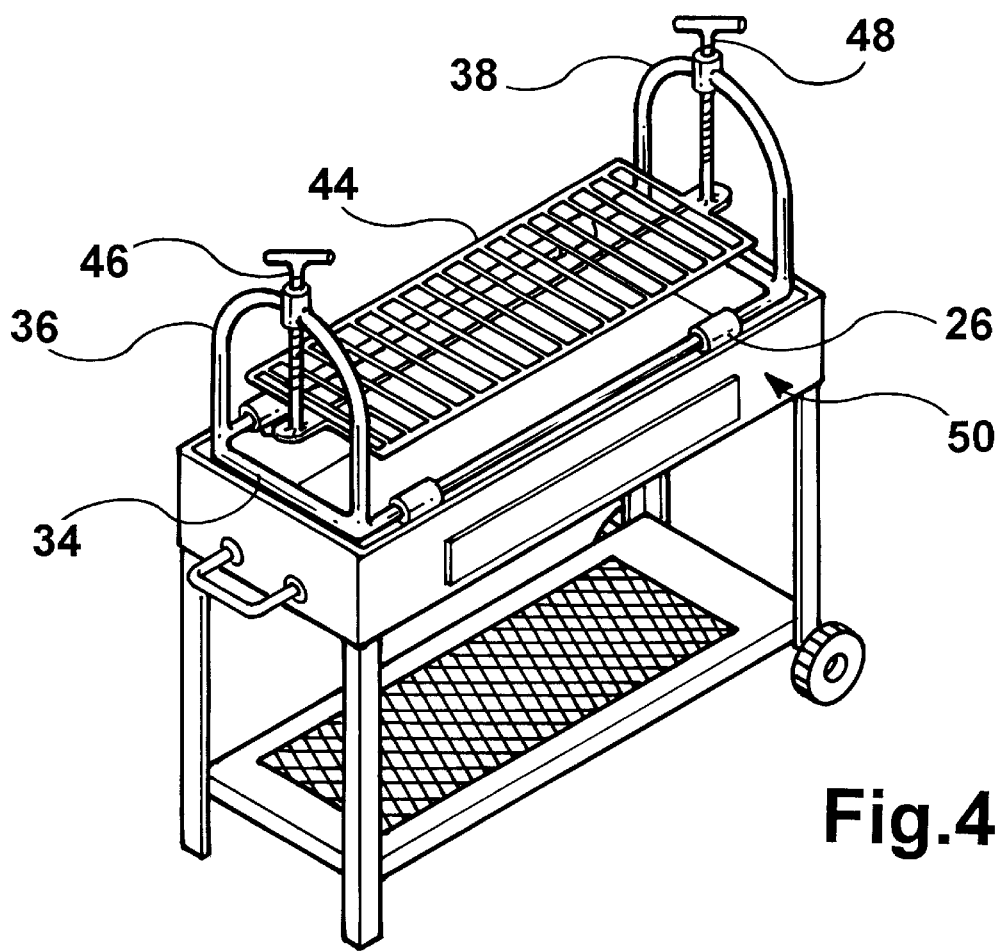
Figure 3:
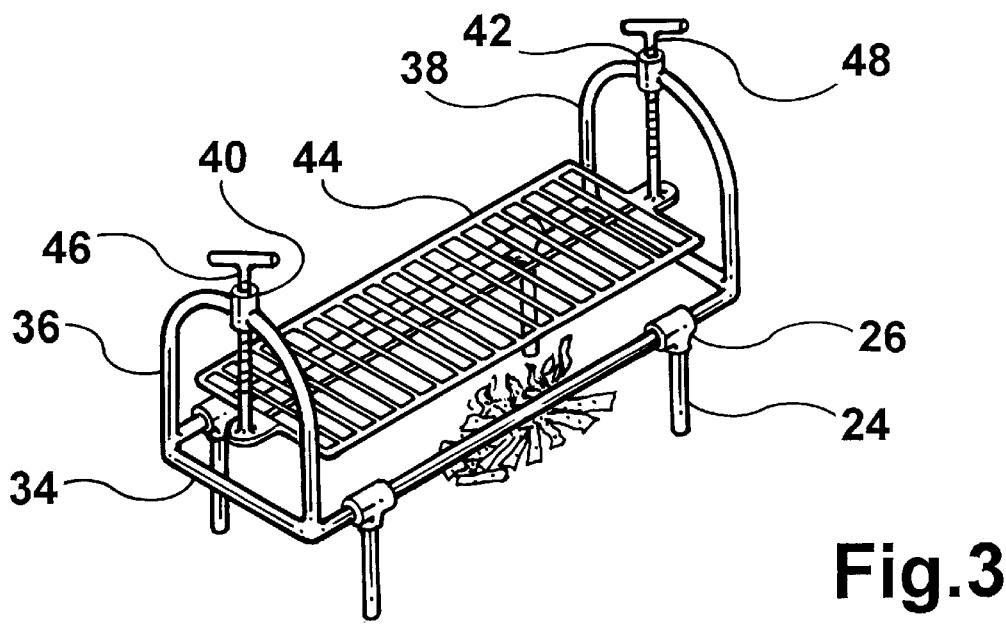
FIG. 3 is a perspective view showing a second preferred embodiment of the present invention used over a campfire built on the ground; and, FIG. 4 is a perspective view showing the second preferred embodiment of FIG. 3 used in association with another type of barbecue machine.

FIGS. 1 and 2 show a first preferred embodiment of the present invention; FIGS. 3 and 4 show a second preferred embodiment. In FIGS. 1 and 3, the invention is shown in use over a campfire that has been built on the ground. In FIGS. 2 and 4, the invention is used on conventional barbecue machines of different shapes.

As best seen in FIG. 1, the apparatus of the present invention includes a frame 14 that bounds an open circular area lying in a horizontal plane parallel to the ground. In contrast, the frame of the embodiment shown in FIG. 3 is rectangular. An arch 16, lying in vertical plane, is attached to the frame 14, preferably on opposite sides of the frame 14. As used herein, the term arch is not limited to circular arches, but includes any structural member that rises from one side of the frame, passes over the area enclosed by the frame, and descends to the opposite side of the frame. A nut 18 is located at the summit of the arch 16, and the axis of the nut is vertical. A threaded rod 20 extends through the nut 18 and engages its threads. The lower end of the threaded rod 20 is attached to a food shelf 22 which may be formed from a plurality of spaced grids. In the preferred embodiment the lower end of the threaded rod is affixed to the food shelf and turns with it. This maximizes stability of the food shelf. In an alternative embodiment, the threaded rod is pivotally attached to the food shelf.

The frame 14 includes a plurality of sockets, of which the socket 26 is typical for receiving and engaging downwardly-extending legs, of which the leg 24 is typical. The length of the legs is not critical because the height of the food shelf 22 above the heat source 12 can be adjusted by using the handle 32 to turn the threaded rod 20.

When used in association with a popular type of barbecue machine 30, as in FIG. 2, the legs are removed from the sockets, and the frame 14 is lowered onto brackets, of which the bracket 28 is typical, that extend inwardly from the inner surface of the barbecue machine and which are used for supporting a fixed food shelf in the conventional barbecue machine. For clarity, in FIG. 2 the frame is shown lifted above the brackets.

Although sockets, like the socket 26, are provided in the preferred embodiment to receive the downwardly-extending legs, in other embodiments the legs fit into sleeves and may be held there by a detent. In yet another embodiment, the legs are hinged to the frame.

In the embodiment of FIGS. 3 and 4, the frame 34 bounds a rectangular area in a horizontal plane. Two arches 36 and 38 arise from the frame 34, and these are provided with nuts 40 and 42, respectively. The height of the food shelf 44 above the heat source 12 is adjusted by turning the threaded rods 46 and 48.

In the embodiment of FIGS. 3 and 4, the frame 34 has the shape of the upper lip of the fire box of the barbecue machine 50, but is slightly smaller so that the frame 34 fits into the fire box and rests on brackets that are provided for supporting a fixed food shelf. When the apparatus of FIG. 3 is used in association with the barbecue machine 50 as in FIG. 4, the legs may be left in place or removed as circumstances may require.

Thus, there has been described an apparatus for adjusting the height of food that is being cooked above a heat source, and it is seen that the invention may be employed in association with barbecue machines of various sizes and shapes. It is seen that the apparatus can be constructed of inexpensive materials and is simple and reliable.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A portable grill for adjusting the height of a food carrying shelf, the grill removably positionable above a separate heat source positioned on a generally horizontal supporting surface, comprising:

a horizontally disposed circular frame that is removably positioned above said separate heat source, said frame including at least three downwardly disposed leg sections which engage said support surface for removably positioning said grill above said horizontal supporting surface;

a vertically disposed arch extending upward to a summit from two spaced apart locations on opposite sides of said circular frame, said arch including a threaded nut having a vertical axis attached to said summit;

a threaded rod having a handle affixed to an upper end and a food shelf affixed to a lower end, said rod engaging said nut between said handle and shelf and extending vertically downward and upward from said nut; and, said circular food shelf formed from spaced apart grids for supporting the food being cooked and positionable at an adjustable height relative to said frame by rotation of said threaded rod.

2. The apparatus of claim 1 wherein said food shelf is pivotally attached to the lower end of said threaded rod.

3. The portable grill of claim 1 wherein said at least three leg sections are formed from a plurality of arc portions of said circular frame for engaging elevated portions of said support surface.

4. A portable grill for adjusting the height of a food carrying shelf, the grill removably positionable above a separate heat source that is positioned on a generally horizontal supporting surface, said grill comprising:

a horizontally disposed rectangular frame that is removably positioned above said separate heat source, said frame including at least four downwardly disposed legs which engage said support surface for removably positioning said grill above said generally horizontal supporting surface;

a pair of vertically disposed arches, each arch extending upward to a summit from two spaced apart locations on opposite sides of said frame and each arch including a threaded nut having a vertical axis attached to its summit;

a pair of threaded rods, each having a handle affixed to an upper end and both having a common food shelf affixed to a lower end, each of said rods engaging a threaded nut between a handle and said common shelf and extending vertically downward and upward therefrom; and, a food shelf formed from spaced apart grids for supporting the food being cooked and positionable at an adjustable height relative to said frame by rotation of each of said threaded rods.

* * * * *